April 8, 1930.  C. McG. SYKES ET AL  1,754,064
PLATFORM WEIGHING MACHINE OF THE PORTABLE TYPE
Filed Aug. 27, 1928  2 Sheets-Sheet 1

Inventors:—
Cameron McG. Sykes
Arthur Binns
by George L. Folke
their Attorney.

Patented Apr. 8, 1930

1,754,064

UNITED STATES PATENT OFFICE

CAMERON McGREGOR SYKES AND ARTHUR BINNS, OF BIRMINGHAM, ENGLAND, ASSIGNORS TO W. & T. AVERY LIMITED, OF BIRMINGHAM, ENGLAND

PLATFORM WEIGHING MACHINE OF THE PORTABLE TYPE

Application filed August 27, 1928, Serial No. 302,330, and in Great Britain October 4, 1927.

This invention has reference to improvements in or relating to platform weighing machines of the portable type.

In connection with weighing machines of the aforesaid kind it will be appreciated that it is desirable that the weighing mechanism should be locked when the machine is being moved so as to minimize or prevent damage to the relatively delicate portions of the weighing mechanism, such as the knife edges and the indicating mechanism, and hence it has been proposed to provide weighing machines of the aforesaid kind with means for locking the weighing mechanism when required. With the forms of locking means heretofore proposed, however, it has been possible for the locking means to be left in the inoperative position whereby it is possible for the machine to be moved with the weighing mechanism in the unlocked condition.

The present invention has for its object the provision of means which ensures that the weighing mechanism shall be locked when a weighing machine is being moved.

The invention consists of an improved platform weighing machine of the portable type wherein the weighing mechanism is locked automatically when the machine is moved bodily, means being provided for effecting the unlocking of the said mechanism as and when required. The invention further resides in the details of construction of the locking means.

The invention will now be described with particular reference to the accompanying sheet of drawings, wherein:—

Figure 3 is a diagrammatic view illustrating the upper portion of the locking device with the parts thereof in the locking position.

Figure 4 is a diagrammatic view illustrating the lower portion of the locking device with the parts thereof shewn in the position occupied when the weighing mechanism is in the locked condition.

In the drawings like numerals of reference indicate similar parts in the several views.

Figure 1:
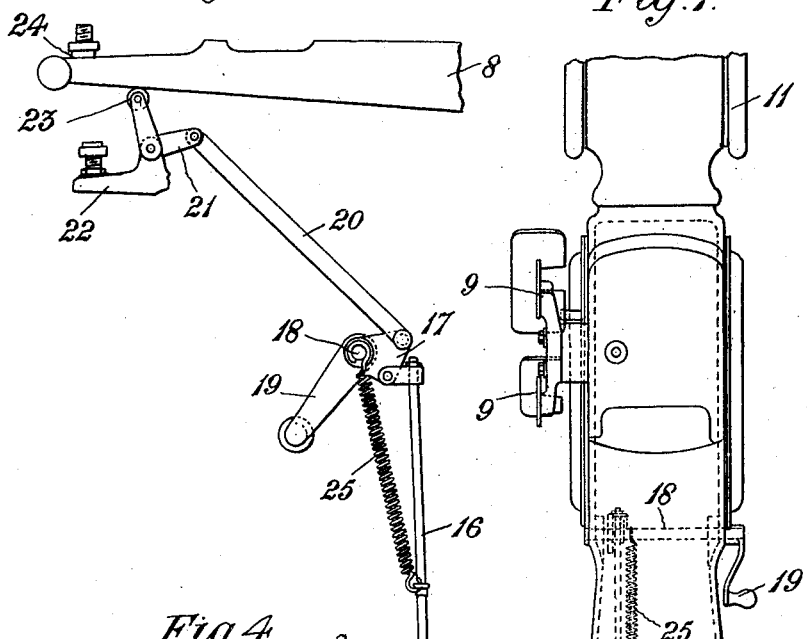
Figure 1 is a part sectional side elevation showing the invention embodied in a portable weighing machine of known construction sufficient only of which is shewn as is necessary to an understanding of the invention, the parts of the locking device being seen in the positions occupied when the weighing mechanism is in the unlocked position.

In the construction of portable platform illustrated the wheels 5 are mounted on axles 6 which pass through the base housing 7 in which the base lever system of the machine is contained. This lever system is connected to the automatic weight indicating mechanism through an intermediate lever 8 to which a tare beam 9 is preferably connected, said lever 8 being disposed within a casing 10 connecting the base housing 7 and a housing 11 within which is located the automatic weight indicating mechanism.

Fixed to the rear axle 6 at the centre thereof is a disc 12 having a smooth peripheral edge upon which is adapted to bear the forked nose 13ª of a pawl 13 which is pivotally mounted intermediate the ends of a lever 14 fulcrumed at one end to a bracket 15 fixed to the base housing 7. The other end of the lever 14 has a pivotal connection to the lower end of a connecting rod 16 the upper end whereof is pivotally connected to a triangular shaped plate 17 adjacent to one corner thereof. The plate 17 is secured adjacent to another corner to a horizontally disposed rotatable spindle 18 the outer portion whereof projects through the front of the casing 10 and has hinged thereto a handle 19. The remaining corner portion of the plate 17 has a pivotal connection to a link 20 which in turn has connection to one arm of a bell crank lever 21 which is fulcrumed in a bracket 22 fixed to the vertically disposed casing 10 of the machine. The other arm of the bell crank lever is provided at its end with a roller 23 disposed below and adapted when required to bear on the lower edge of the intermediate lever 8 and to press the said lever 8 into firm contact with an adjustable stop 24 fixed to the casing 10.

The connecting rod 16 is anchored to one end of a coil spring 25 the other end whereof is attached to the spindle 18.

The lever 14 carrying the depending pawl 13 is provided with an inclined arm 14ª to the end whereof is attached the upper end of a diagonally disposed coil spring 26 the lower end whereof is anchored to the base housing.

The pawl 13 is formed with an arm 13ᵇ which has connection to one end of a coil spring 27, the other end whereof is anchored to the lever 14.

The operation of the invention is as follows:—

Figure 2:
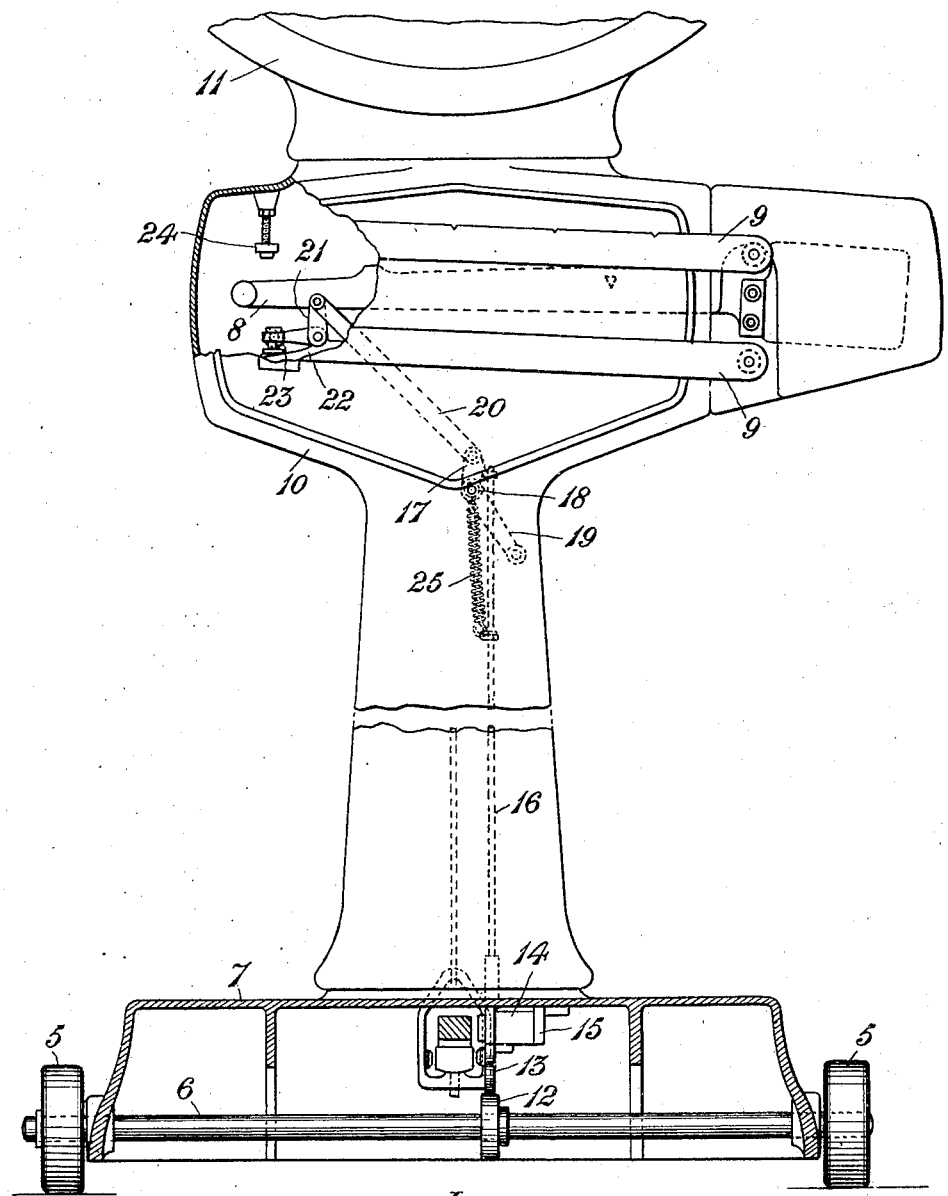
Figure 2 is a part sectional front elevation of the weighing machine seen in Figure 1.

When the weighing machine is in the unlocked position the pawl 13 is adapted to depend in a substantially vertical position with the forked nose 13ª thereof resting on the periphery of the disc 12 keyed on the rear axle 6 whereby the lever 14 carrying the said pawl is maintained in the raised position against the resistance of the diagonally disposed spring 26 (see Figures 1 and 2). Upon a bodily movement being imparted to the machine the rotation of the axle 6 thereby engendered causes a displacement of the pawl 13 whereupon the lever 14 carrying the said pawl is rocked about its pivot and pulled downwardly under the action of the aforesaid diagonally disposed spring 26. This downward movement of the pawl carrying lever 14 effects a correspondingly downward movement of the connecting rod 16 which rod through the plate 17 and link 20 connected therewith effects a rocking of the bell crank lever 21 whereby the roller carried by one arm thereof is caused to bear on the lower edge of the intermediate lever 8 and to force the upper edge of the said lever or tare beam against the co-operating stop 24. The weighing mechanism is thus locked and the movement of the machine can then be continued without risk of damage to the weighing mechanism.

When it is desired to operate the machine the weighing mechanism can be unlocked by rotating the handle 19 whereby the lever 14 carrying the pawl is drawn upwardly and the forked nose 13ª of the pawl 13 is again caused to depend in a vertical position and rest on the periphery of the disc 12.

It will be appreciated that the spring 27 connected to the crank arm 13ᵇ on the pawl maintains the pawl in a sufficiently rigid condition to obviate a displacement of the pawl due to vibration, the said spring, however, is sufficiently sensitive to ensure that the locking gear shall come into operation after a slight bodily movement of the machine.

In a modification the lower end of the connecting rod may be attached to one arm of a bell crank lever, the other arm whereof is provided with a substantially wedge-shaped head adapted to engage between one pair of a plurality of horizontally disposed heads arranged at equi-distantly spaced intervals on the face of a disc keyed on to the wheel axle, the arm of the bell crank lever attached to the connecting rod being secured to one end of a spring, the other end whereof is anchored to a fixed bracket. If desired the bell crank lever may have a pair of wedge-headed arms disposed one on either side of the disc in which case the disc is provided with pegs on each face thereof and a pair of springs are employed.

The operation of this modified construction is generally similar to that of the first mentioned construction. Upon the rotation of the axle one or other of the pins according to the direction of rotation of the axle press on the respective face of the wedge-shaped head and cause the said head to move outwardly and thereby effect a rocking of the bell crank lever against the action of the spring. The rocking movement of the bell crank lever causes the connecting rod to be pulled downwardly whereby the rocking roller is brought into operation in the manner hereinbefore described.

An automatic locking gear as hereinbefore described ensures that a portable weighing machine cannot be moved with its weighing mechanism in the unlocked position thereby obviating damage to the weighing mechanism due to inadvertence of negligence to observe whether the weighing mechanism is locked as may obtain with machines fitted with the locking means heretofore proposed. Furthermore the locking gear is simple in construction, efficient in operation and capable of being embodied in existing forms of weighing machines without necessitating any material alteration thereto.

What we claim is:—

1. A platform weighing machine of the portable type embodying a rotatable supporting means for the machine, a member rotatable with and in association with said supporting means, means for locking the weighing mechanism in an inoperative position, means governed by the aforesaid member for maintaining the locking means in an inoperative position, means for bringing the locking means into operation consequent upon the disturbance of the member due to a bodily movement being imparted to the machine and means for effecting an unlocking of the said mechanism when required.

2. A platform weighing machine of the portable type embodying a rotatable supporting means for the machine, means for locking the weighing mechanism in an inoperative position, a pivotally mounted member adapted to rest in contact with the rotatable supporting means for maintaining the locking means in an inoperative position when the machine is stationary, said member being displaced upon a bodily movement being imparted to the machine and means whereby the displacement of the said member is caused to bring the locking means into operation to effect a locking of the weighing mechanism.

3. A platform weighing machine of the portable type embodying a rotatable supporting means for the machine, a rotatable member in association with said supporting means, means for locking the weighing mechanism in an inoperative position, a pivotally mounted member adapted to rest in contact with the rotatable member and to maintain the locking means in an inoperative position when the machine is stationary, said member being displaced upon a bodily movement being imparted to the machine, means whereby the displacement of the pivotal member is caused to bring the locking means into operation and means for effecting a freeing of the weighing mechanism as and when required.

4. A platform weighing machine of the portable type embodying a rotatable supporting means for the machine, a rotatable member in association with said supporting means, means for locking the weighing mechanism in an inoperative position, a pawl the nose whereof is adapted to rest in contact with the rotatable member and to maintain the locking means in an inoperative position when the machine is stationary, means for connecting the said pawl to the aforesaid locking means and means for effecting the locking of the weighing mechanism upon the displacement of the pawl from the rotatable member consequent upon a bodily movement being imparted to the machine.

5. A platform weighing machine of the portable type embodying a rotatable supporting means for the machine, a rotatable member in association with said supporting means, means for locking the weighing mechanism in an inoperative position, a depending pivotally mounted member the nose whereof is adapted to rest when in a vertical position on the said rotatable supporting means and to maintain the locking means inoperative, means for interconnecting the said pivotally mounted member and the locking means, means for causing the locking means to be brought into operation upon the displacement of the member from the vertical position consequent upon a bodily movement being imparted to the machine and means for restoring the weighing mechanism to the unlocked condition as and when required.

6. A platform weighing machine of the portable type embodying a rotatable supporting means for the machine, a rotatable member in association with said supporting means, means for locking the weighing mechanism in an inoperative position, a lever, a member pivotally connected to said lever and adapted to depend therefrom so that the nose thereof when in the vertical position rests on the rotatable member and maintains the locking means in an inoperative position, a spring anchored at one end to said lever and at its other end to a fixed member said spring serving to cause the locking means to be brought into operation upon the displacement of the pivotal member from a vertical position due to a bodily movement being imparted to the machine and means for effecting an unlocking of the weighing mechanism as and when required.

7. A platform weighing machine of the portable type embodying a rotatable supporting means for the machine, a rotatable member in association with said supporting means, means for locking the weighing mechanism in an inoperative position, a lever, a connecting means between said lever and the locking means, a member pivotally connected to the lever and adapted to depend therefrom so that the nose thereof when the pawl is in a vertical position may be caused to rest in contact with the rotatable member and to maintain the locking means in an inoperative position, a spring connected to said pivotal member and lever for assisting the action of the pivotal member, a spring connected to the lever and to a fixed abutment for causing the locking means to be brought into operation upon the displacement of the pivotal member from a vertical position due to a bodily movement being imparted to the machine and means for restoring the weighing mechanism to the unlocked position as and when required.

8. A platform weighing machine of the portable type embodying a rotatable supporting means for the machine, a disc secured to and rotatable with the said rotatable supporting means, means for locking the weighing mechanism in an inoperative position, a lever, a connection between said lever and the locking means, a member pivotally connected to the lever and adapted to depend therefrom so that when the said member is in the vertical position the nose thereof rests on the periphery of the disc and maintains the locking means in an inoperative position, a spring connected to the lever and to a fixed abutment said spring serving to cause the locking means to be brought into operation upon the displacement of the pivotal member from the vertical position due to the rotation of the disc as occasioned upon a bodily movement being imparted to the machine and manually operable means for restoring the weighing mechanism to the unlocked position as and when required.

In testimony whereof we have signed our names to this specification.

CAMERON McGREGOR SYKES.
ARTHUR BINNS.